United States Patent
Bahammam

(10) Patent No.: US 11,311,356 B1
(45) Date of Patent: Apr. 26, 2022

(54) FINGER REST CLIP FOR DENTAL IMPRESSION TRAY

(71) Applicant: King Abdulaziz University, Jeddah (SA)

(72) Inventor: Hammam Ahmed Salim Bahammam, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/517,271

(22) Filed: Nov. 2, 2021

(51) Int. Cl.
*A61C 9/00* (2006.01)

(52) U.S. Cl.
CPC .................................. *A61C 9/0006* (2013.01)

(58) Field of Classification Search
CPC .................... A61C 9/00–0013; A63B 71/085
See application file for complete search history.

(56) References Cited

U.S. PATENT DOCUMENTS

| | | | | |
|---|---|---|---|---|
| 1,323,832 A | * | 12/1919 | Chige | A61C 9/0006 433/46 |
| 1,411,156 A | | 3/1922 | Bowen | |
| 1,487,392 A | * | 3/1924 | Lee | A61C 9/0006 433/41 |
| 1,584,092 A | * | 5/1926 | Harris | A61C 9/0006 433/46 |
| 2,117,846 A | * | 5/1938 | Kalvin | A61C 9/0006 433/46 |
| 2,802,269 A | * | 8/1957 | Stern | A61C 9/0006 433/41 |
| 4,003,132 A | * | 1/1977 | Beck | A61C 9/0006 433/42 |
| 4,449,927 A | * | 5/1984 | Taylor | A61C 9/00 433/45 |
| 4,668,188 A | | 5/1987 | Wolfenson et al. | |
| 5,820,372 A | * | 10/1998 | Jones | A61C 9/0006 433/38 |

(Continued)

OTHER PUBLICATIONS

"Cotisen Flexible Bite Registration Tray (Colored)", Dentalkart, https://www.dentalkart.com/cotisen-flexible-bite-registration-tray-colored.html, May 31, 2021, 5 pages.

(Continued)

*Primary Examiner* — Edward Moran
*Assistant Examiner* — Matthew P Saunders
(74) *Attorney, Agent, or Firm* — Oblon, McClelland, Maier & Neustadt, L.L.P.

(57) ABSTRACT

A finger rest clip, a method of using a finger rest clip and a system for taking an impression of a tooth structure are described, the finger rest clip including an attachment portion which fits over a flange of a dental impression tray and a finger rest portion which extends outwardly from the flange at an angle. The finger rest is designed to prevent the fingers a dentist from being bitten as the dental impression tray is positioned in the mouth of a patient. Two or more finger rest clips are used on the dental impression tray in opposing positions on the flange to enable balanced positioning. The finger rest clips have an attachment part which conforms to the shape of the flange, and may have gripping features. The attachment part and/or the finger rest may be covered with a hydrophilic coating or a biocompatible coating.

20 Claims, 8 Drawing Sheets

(56) References Cited

U.S. PATENT DOCUMENTS

| | | | |
|---|---|---|---|
| 6,902,398 B1* | 6/2005 | Segal | A61C 9/0006 433/45 |
| 7,021,929 B2 | 4/2006 | DiMarino et al. | |
| 10,631,960 B2 | 4/2020 | Dimarino | |
| 10,772,493 B2* | 9/2020 | Choi | A61C 1/08 |
| 11,179,228 B1* | 11/2021 | Bahammam | A61C 9/0006 |
| 2003/0138754 A1* | 7/2003 | DiMarino | A61C 9/0006 433/37 |
| 2008/0113312 A1* | 5/2008 | Ortega | A61C 5/90 433/140 |
| 2013/0066236 A1* | 3/2013 | Herman | A63B 71/085 600/595 |
| 2013/0084539 A1* | 4/2013 | Yasaki | A61C 9/0006 433/37 |
| 2013/0224680 A1* | 8/2013 | McDonald | A61C 9/0006 433/38 |

OTHER PUBLICATIONS

"Sani-Trays Anterior Bite Impression Trays, Plastic with Mesh, Box of 35", Frontier Dental Supplies, Water Pik, Inc., https://www.net32.com/ec/sanitrays-anterior-bite-impression-trays-plastic-mesh-d-42849, Jun. 4, 2021, 4 pages.

* cited by examiner

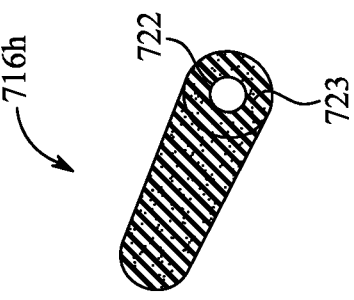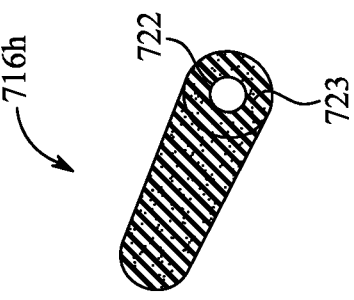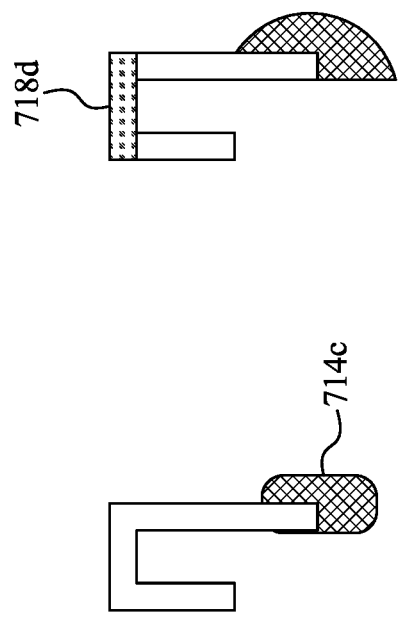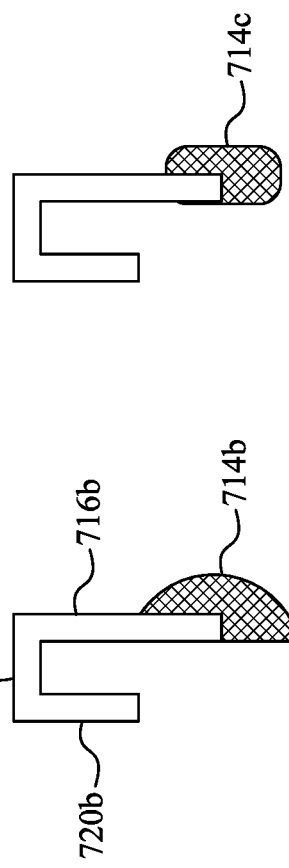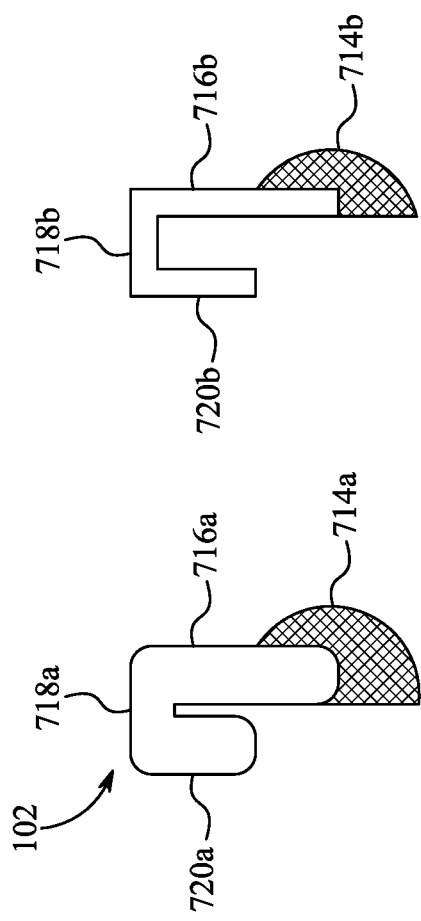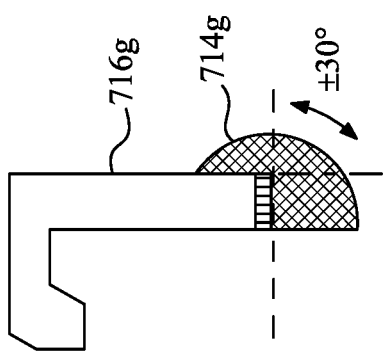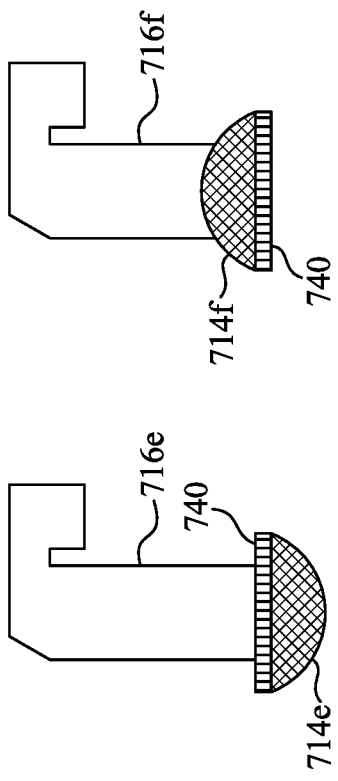

FINGER REST CLIP FOR DENTAL IMPRESSION TRAY

CROSS REFERENCE TO RELATED APPLICATIONS

The present application is related to U.S. application Ser. No. 17/339,389, entitled "Dental Impression tray device and method of manufacturing the device", filed on Jun. 4, 2021 which is incorporated herein by reference in its entirety.

BACKGROUND

Technical Field

The present disclosure is directed to finger rest clips for use with dental impression trays.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dental occlusion is an important aspect of the digestion process. One way to evaluate the bite is by taking impression of the teeth. To take an impression of the teeth, an impression tray is used to carry impression material. The impression of the teeth may be used to evaluate the need of orthodontic treatment, fabricate space maintainers and indirect fillings. One of the difficulties faced by dentists while taking impression is uncontrolled opening and closing of the mouth of patients. Such movement of the mouth may lead to accidental biting, which in turn may lead to trauma and injury to the fingers of dentists or the oral tissue of the patients, which may further lead to cross infection and transmission of diseases between the dentist and the patient.

Patients with special needs, such as those patient's with neurological problems, may have difficulty controlling their mouth movements. Unexpected mouth closing by a patient may lead to aspiration of the materials, which in turn may lead to serious health complications. Further, when a dentist is taking the impression, he may place two fingers over the impression tray to stabilize it. A patient with neurological problems may accidently close his mouth and bite the two fingers, as the patient cannot control his mouth movement.

Dental impression trays have been developed with include a finger rest as part of the impression tray. However, older style dental impression trays do not have integral finger rests.

Accordingly, it is one object of the present disclosure to prevent injury to the fingers of the dentist taking an impression by providing a finger rest clip for use with a dental impression tray, a method for using a finger rest clip with a dental impression tray to take an impression of teeth, and a system for taking an impression of a tooth structure of a patient's mouth, where the finger rest clip is disposable or sterilizable.

SUMMARY

In an exemplary embodiment, a finger rest clip for use with a dental impression tray, the dental impression tray having a flange surrounding a central cavity is described, comprising an attachment part, wherein a first end of the attachment part is configured to hook over the flange; and a finger rest configured to extend at an angle with respect to a perpendicular of a second end of the attachment part.

In another exemplary embodiment, a method for using a finger rest clip with a dental impression tray to take an impression of teeth is described, comprising positioning at least one finger rest clip above a flange of a dental impression tray; pushing a top shank portion of the at least one finger rest clip downwards until the top shank portion contacts a top of the flange, a first shank portion contacts an outer side of the flange and a second shank portion contacts an inner side of the flange; filling a cavity of the dental impression tray with impression material; inserting the dental impression tray into a mouth of a patient; instructing the patient to close the mouth while positioning the dental impression tray in the mouth by pressing on a finger rest of the at least one finger rest clip; and removing the dental impression tray after the impression material has set.

In a further exemplary embodiment, a system for taking an impression of a tooth structure of a patient's mouth is described, comprising a dental impression tray configured with a flange surrounding a central cavity, wherein the dental impression tray is one of an upper dental impression tray configured for taking an impression of a maxillary teeth structure and a lower dental impression tray configured for taking an impression of a mandibular teeth structure; a plurality of finger rest clips, each finger rest clip including an attachment part configured to couple to the flange and a finger rest configured to extend outwardly at an angle to the flange; and a dental impression material configured to fill the central cavity.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A illustrates a finger rest clip having a cylindrical shank portion and a semicircular finger rest, according to certain embodiments.

FIG. 7B illustrates a finger rest clip having a rectangular shank portion and a semicircular finger rest, according to certain embodiments.

FIG. 7C illustrates a finger rest clip having a rounded rectangular finger rest, according to certain embodiments.

FIG. 7D illustrates a finger rest clip having a patterned top shank portion, according to certain embodiments.

FIG. 7E illustrates a finger rest clip having a hinge, according to certain embodiments.

FIG. 7F illustrates an unlocked positon of the hinge, according to certain embodiments.

FIG. 7G illustrates a locked position of the hinge, according to certain embodiments.

FIG. 7H illustrates a cross-section of a cylindrical shank having a cylindrical wire surrounded by a biocompatible coating, according to certain embodiments.

DETAILED DESCRIPTION

Figure 1:
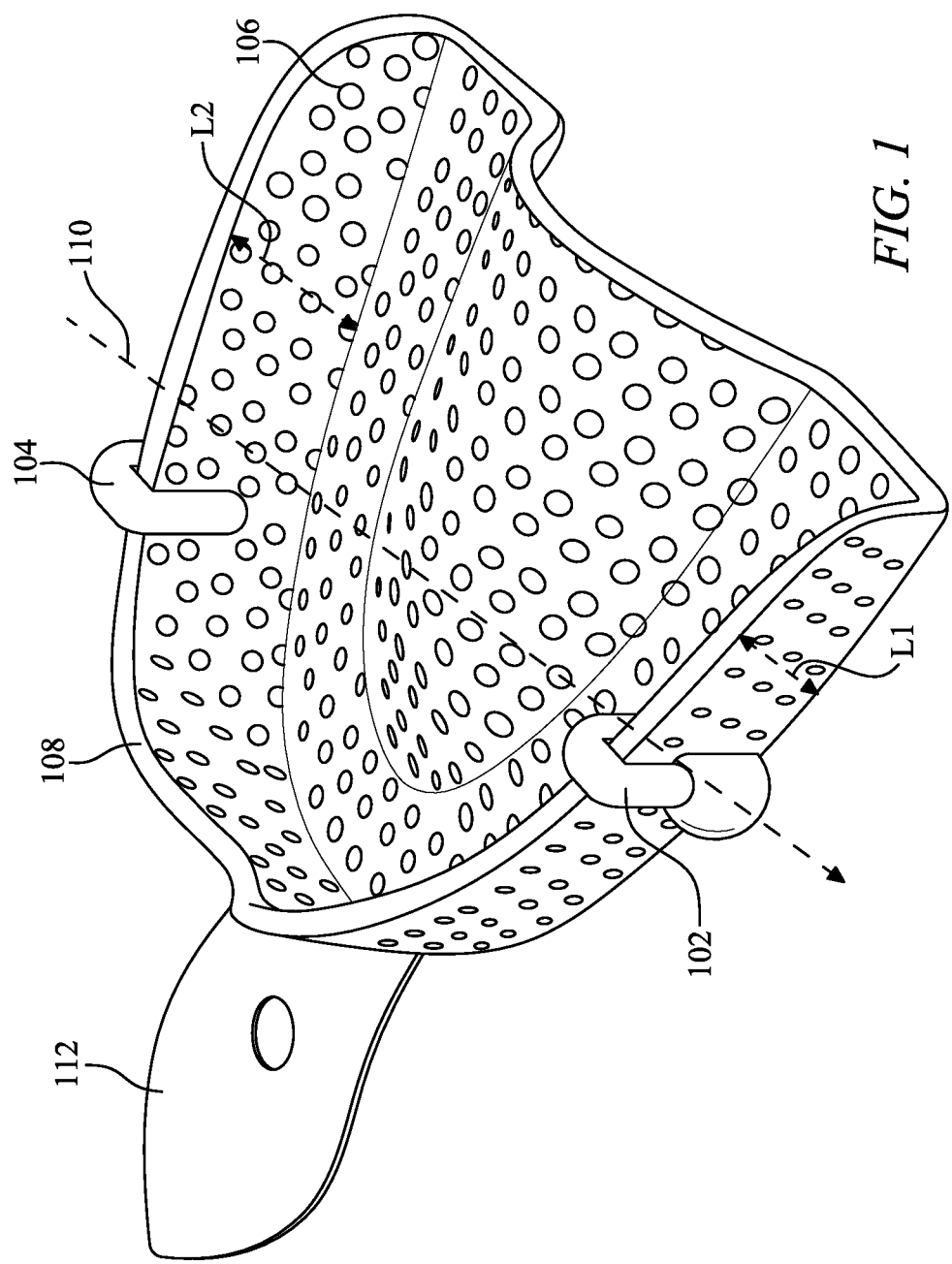
FIG. 1 is an illustration of a dental impression tray having finger rest clips positioned on the midline of a dental impression tray, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, the term "occlusion" refers to how the teeth come together. A malocclusion, an occlusal disease, and a bad bite refer to situations in which the upper and lower teeth, or jaw, are misaligned and come together in ways that can damage or destroy teeth.

Aspects of the present disclosure are directed to a finger rest clip for use with a dental impression tray, methods for using a finger rest clip with a dental impression tray to take an impression of teeth using a finger rest clip with a dental impression tray, and a system for taking an impression of a tooth structure of a patient's mouth.

Aspects of the present disclosure describe adding removable, reusable or disposable clips including a finger rest to the dental impression tray. These finger rest clips enhance the use of dental impression trays which do not include finger rests as part of the tray. Once the finger rest clips are fitted on the impression tray the finger rests will be at the same level with the body of the dental impression tray and its handle.

The finger rest clip is formed to fit over the flange of a dental impression tray and provide the finger rest away from the occlusion.

The finger rests may be placed on either side of the dental impression tray between the front of the dental impression tray and its midline. This balances the impression tray while the dentist presses the tray downwards (or upwards, for an upper mouth impression) during the impression taking, in addition to preventing injury to the dentist's fingers.

The finger rest prevents the patient from biting the dentist's fingers, as it is located away from the occlusion. Further, the finger rest may be held so as to stabilize the impression tray until the impression material is set, in order to prevent shifting or aspiration of impression material by the patient.

The attachment of finger rest clips to a dental impression tray will increase the productivity, efficiency and accuracy of the impression taken, and will prevent the risk of injury. Use of the finger rest clips may minimize the risk of error by controlling the impression tray during the impression process.

In aspects of the present disclosure, two finger rests clips may be attached to the impression tray in a spaced apart manner parallel to the midline.

In aspects of the present disclosure, the finger rest clips may be of different sizes so as to be used with different sized dental impression trays or attached to different regions of a dental impression tray. The sizes of the finger rest clips are proportional to the size of the flanges of the impression trays.

In aspects of the present disclosure, the finger rest clips may be different colors to indicate their sizes.

In an aspect of the present disclosure, the finger rest clips may have patterned regions to indicate placement on the dental impression tray.

In an aspect of the present disclosure, a first shaft portion may be a different color than a second shaft portion, to permit a dentist to easily identify an orientation the finger rest clip should be inserted on the flange.

In aspects of the present disclosure, the finger rest clips may be made of stainless steel, so as to be reusable after sterilization.

In aspects of the present disclosure, the finger rest clips may be made of plastic so as to be disposable.

In some aspects of the present disclosure, the finger rest clips may be a one-piece construction formed by 3D printing.

In aspects of the present disclosure, a shank of the finger rest clip may be made of wire covered by one of plastic and a plastic coating so as to bend to conform to a flange of the dental impression tray.

In aspects of the present disclosure, the finger rest may be hinged to the shank of the finger rest clip and adjustable in orientation to the shank.

FIG. 1 depicts the placement of the finger rest clips 102 and 104 on a dental impression tray 106. In FIG. 1, the finger rest clips are placed over the flange 108 of the dental impression tray. The finger rest clips 102 and 104 are shown as being placed at approximately the midline 110 of the dental impression tray, but may be placed at any location as needed. In general, the finger rest clips may be placed over the flange between the midline 110 and the handle 112. The outer side of the flange is of height L1 and the inner side of the flange is of height L2, where L1>L2. Therefore, a length of an outer shank of the finger rest clip must be L1 and a length of an inner shank of the finger rest clip must be L2.

The dental impression tray may be an upper dental impression tray or a lower dental impression tray.

Although two finger rest clips are shown in FIG. 1, there may be a plurality of finger rest clips placed over the flange of the dental impression tray 106, as needed to allow the dentist to position and compress the dental impression tray 106 in the mouth of a patient.

Figure 2:
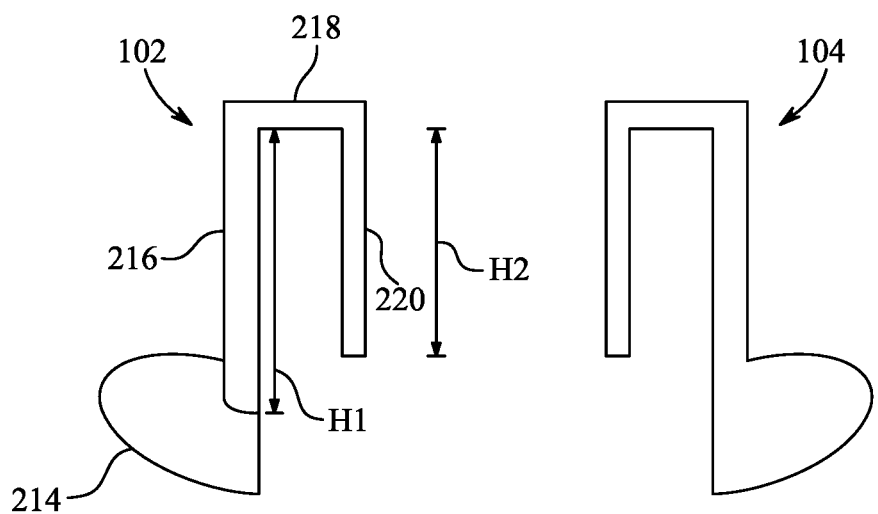
FIG. 2 is an illustration of finger rest clips for an upper dental impression tray, according to certain embodiments.

FIG. 2 illustrates a generalized view of the finger rest clips 102 and 104 in an orientation in which they may positioned on an upper dental impression tray. Each finger rest clip has an attachment part, comprising a finger rest 214, a first shank portion 216, a top shank portion 218 which conforms to the shape of the flange 108 of the dental impression tray 106 and a second shank portion 220. The height H1 of the first shank portion must be less than or equal to L1, and the height H2 of the second shank portion must be less than or equal to L2 and less than or equal to H1.

In an aspect, the first shank portion, the top shank portion and the second shank portion are of the same material and are of one continuous piece.

Figure 3:
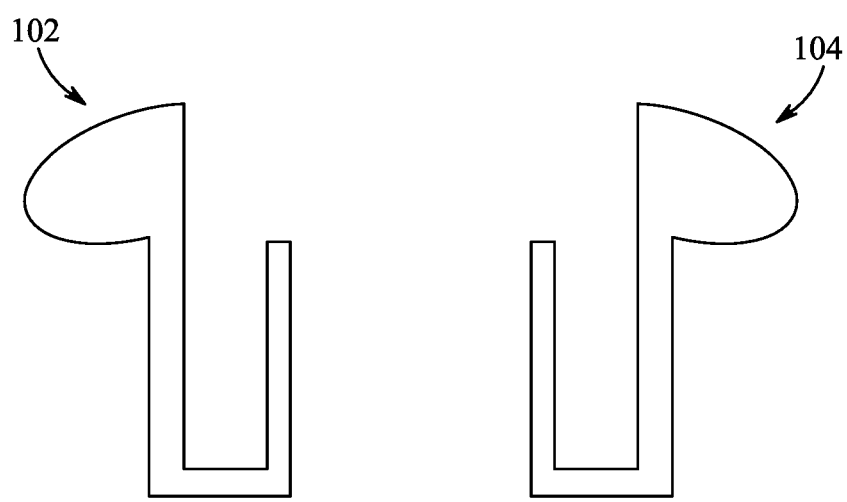
FIG. 3 is an illustration of finger rest clips for a lower dental impression tray, according to certain embodiments.

FIG. 3 illustrates a generalized view of the finger rest clips 102 and 104 in the orientation in which they may placed on a lower dental impression tray. As can be seen from FIG. 2 and FIG. 3, the finger rest clips for the upper tray and the lower tray may be identical, although the finger rest clips may have alternate configurations, such as shaft lengths, hinging between the finger rests 214 and shaft, and the like (not shown in FIG. 2) for each location on the dental impression tray.

Figure 4:
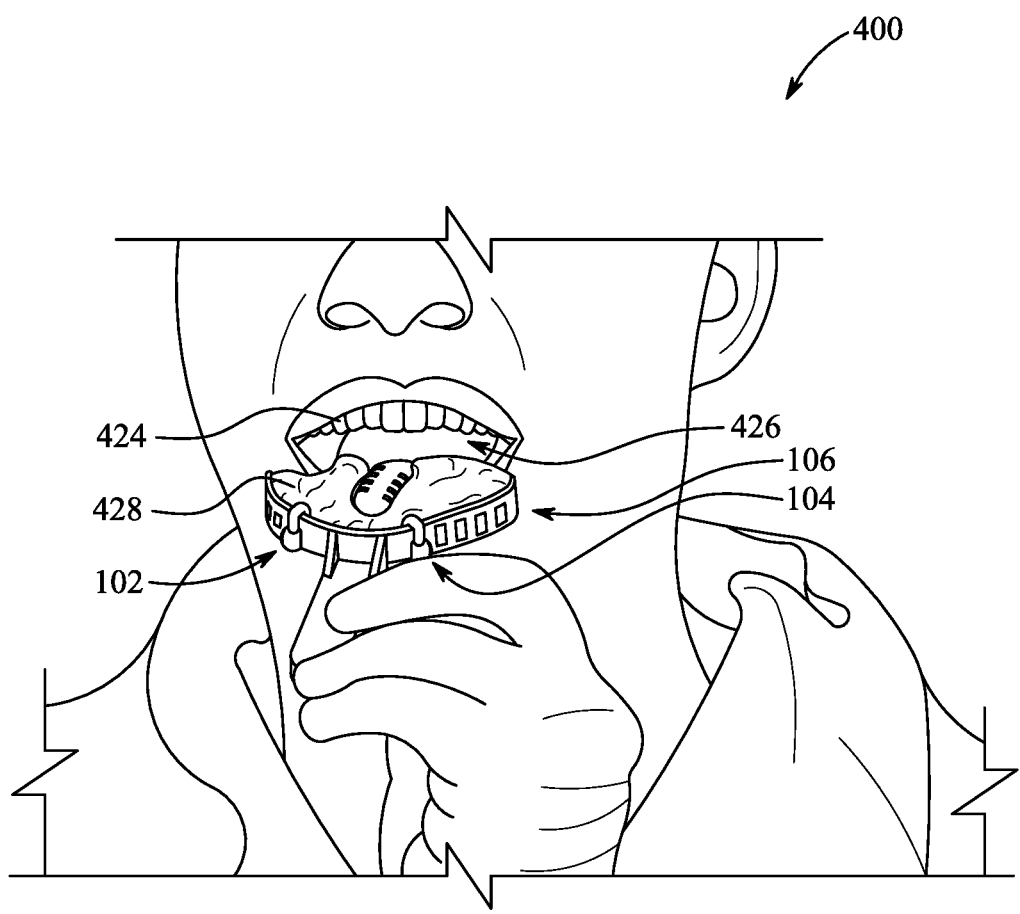
FIG. 4 is an illustration of the insertion of an upper dental impression tray with two finger rest clips over a maxillary tooth structure, according to certain embodiments.

Referring to FIG. 4, a perspective view of an upper dental impression tray 106 used for taking a dental impression of a maxillary teeth structure 424 during a dental procedure is illustrated. The dental impression tray 106 is used for holding an impression material 428 to be placed into an oral cavity 426 for taking the dental impression of the maxillary teeth structure 124. The dental impression tray 106 is designed in an arc shape to fit over the maxillary teeth structure 424 and gums in the oral cavity 426. During the dental procedure, when a dentist wants to take impression of a patient's teeth structure, the dentist inserts a temporarily viscous compound, otherwise referred to as the impression material 122, into the dental impression tray 106 and places the dental impression tray 106 into the mouth of the patient over the maxillary teeth structure 124. The dentist places his fingers on the finger rests 214 of the finger rest clips 102 and 104 and pushes the finger rests upwards to position the impression material 428 along with the dental impression tray device 106 in the mouth, so that when the maxillary teeth press into the impression material 428 gaps between the maxillary teeth structure 424 and the impression material 428 are avoided. After the impression material 428 hardens, the dental impression tray device 106 is removed, and the hardened impression material is then used as a mold.

As the positions of the finger rests are away from the occlusion, any injury to the dentist's fingers during accidental closing of the mouth of the patient is prevented. Further, the finger rests may help the dentist to maintain the stability of the dental impression tray until the impression material is hardened, thereby aspiration of the impression material is avoided. Moreover, the finger rests help the dentist to have more control over the dental impression tray device during the dental procedure and prevent the dentist's fingers from being bitten as the patient closes his mouth.

Figure 5:
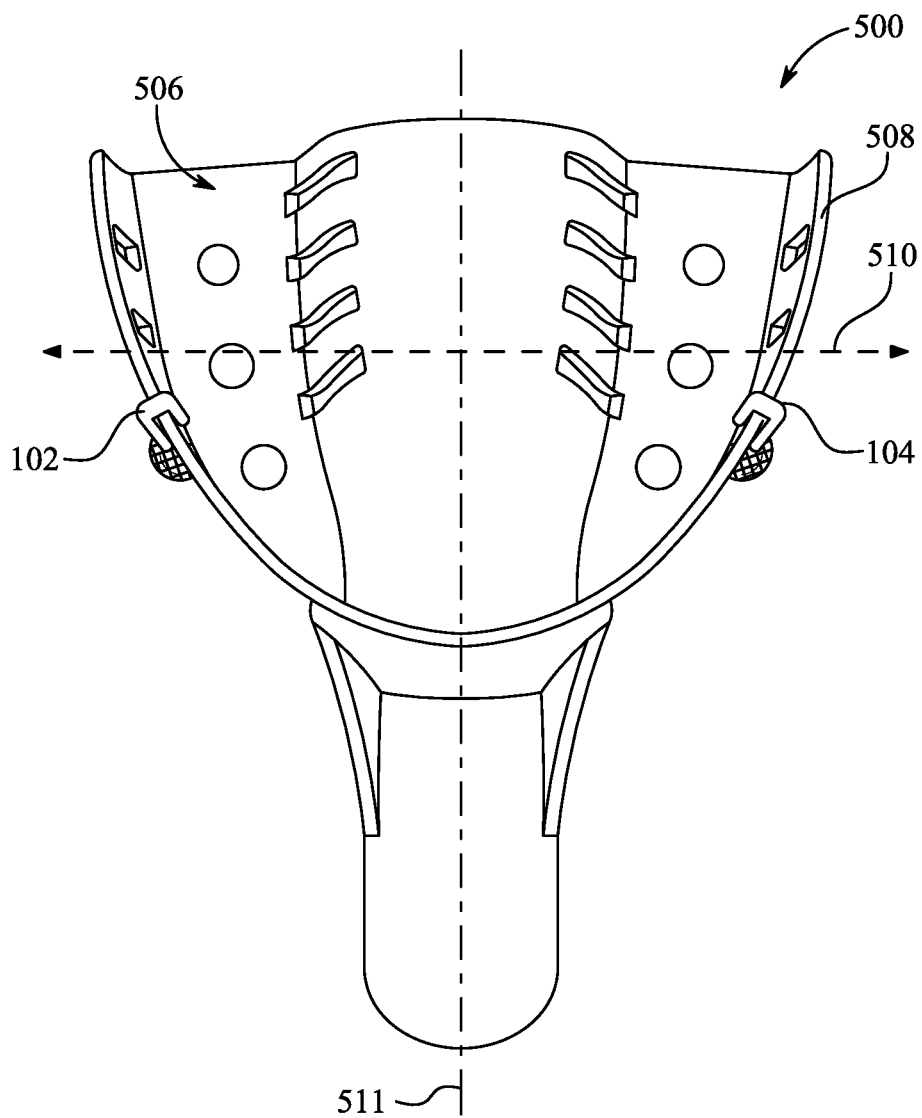
FIG. 5 is an illustration of an upper dental impression tray with two finger rest clips, according to certain embodiments.

FIG. 5 shows a system 500 including an upper dental impression tray 506 used for the maxillary teeth structure 424 with finger rests clips 102 and 104 placed near the midline 510. The finger rests clips 102 and 104 may be inserted on the flange 508 of the upper dental impression tray 506 before or after the impression material 428 is applied.

Figure 6:
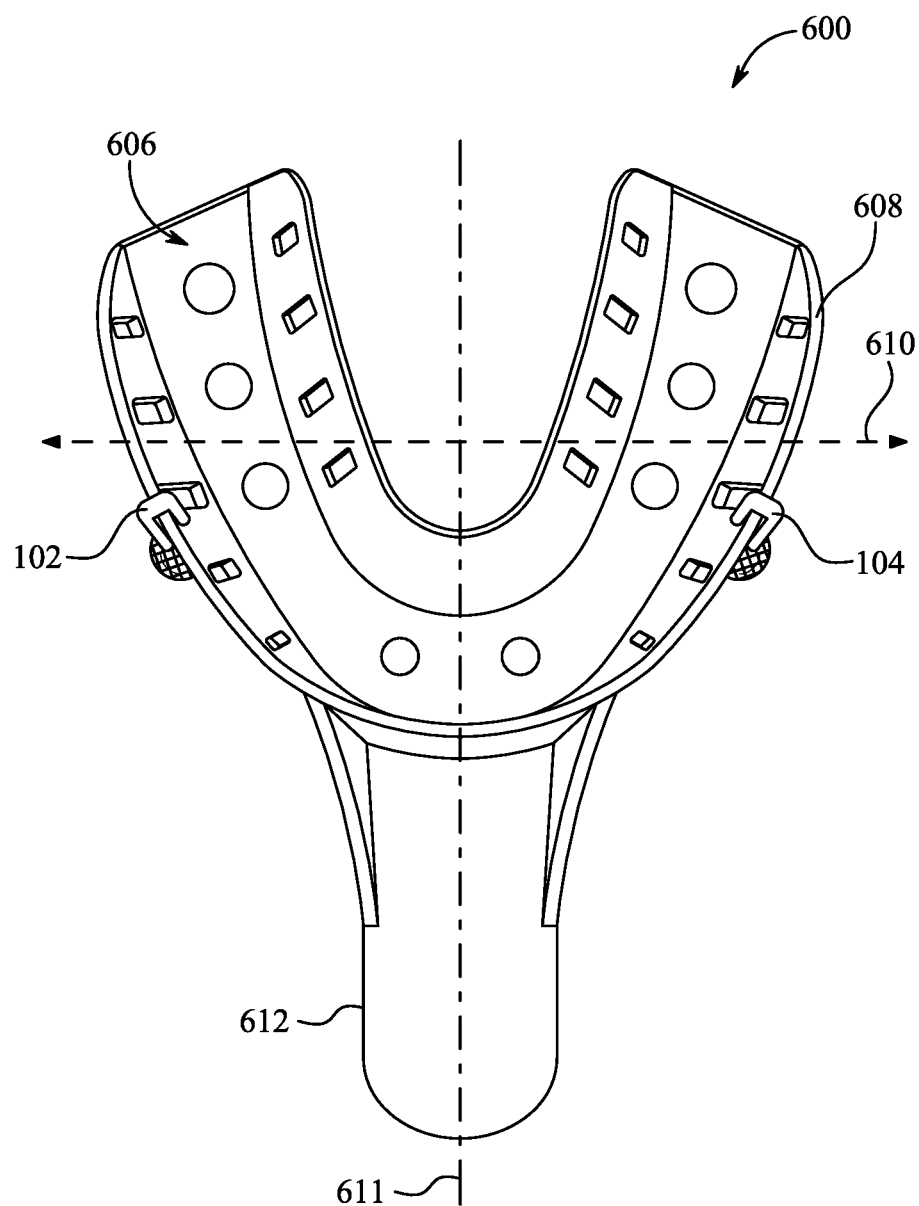
FIG. 6 is an illustration of a lower dental impression tray with two finger rest clips, according to certain embodiments.

The same procedure may be followed for taking a dental impression of a mandibular teeth structure using a system 600 shown in FIG. 6. FIG. 6 shows the system 600 including a lower dental impression tray 606 with finger rest clips 102 and 104 inserted on the flange 608 near the midline 610. The finger rests clips 102 and 104 may be inserted on the flange 608 of the lower dental impression tray 606 before or after the impression material 428 is applied.

The dental impression tray devices used for taking the dental impression of the mandibular teeth structure of FIG. 6 and the maxillary teeth structure 424 of FIG. 5 may be manufactured in different sizes based on size of the oral cavity 426 of patients. For example, a the mouth size of a child is smaller than that of an adult and the mouth cavity of a woman is generally smaller than that of a man. A conventional dental impression tray has a width (across the midline 110 shown in FIG. 1) in the range of 50 mm to 70 mm, and a length along the handle axis 511 or 611 (not including the handle) of 40 mm to 60 mm. The depth of the dental impression tray is in the range of 3 mm to 9 mm in the canine region and 10 mm to 20 mm in the first molar region (close to the midline 110 of FIG. 1). Therefore, the finger rest clips 102 and 104 may be manufactured in different sizes to accommodate the size of the dental impression tray and the position on the dental impression tray.

In an aspect, the shanks forming the attachment portion of the finger rest clips may be cylindrical, as shown in FIG. 7A. FIG. 7A shows the finger rest clip 102 having an attachment portion formed by a cylindrical first shank portion 716a, a cylindrical top shank portion 718a, and a cylindrical second shank portion 720a. A finger rest 714a is connected to the first shank portion 712a.

In an aspect, the shanks of the finger rest clips may be rectangular, as shown in FIG. 7B. FIG. 7B shows the finger rest clip 102 having a cylindrical first shank portion 716b, a cylindrical top shank portion 718b, and a cylindrical second shank portion 720b, with a finger rest 714b.

In an aspect, the finger rest may be semi-circular, as shown in FIGS. 7A and 7B.

In an aspect, the finger rest 714c may be rectangular with rounded corners, as shown in FIG. 7C.

In an aspect, as shown in FIG. 7D, the top shank portion 718d may have a patterned or roughened surface to indicate where to press the finger rest clip onto the flange. Further, the patterned or roughened surface may prevent the dentist's fingers from slipping while inserting the finger rest clip onto the flange.

In an aspect, as shown in FIGS. 7A and 7B, the finger rest may extend perpendicular to the shank.

In an aspect, as shown in the front view of FIG. 7E, the first shank portion 716e may be coupled to the finger rest 714e by hinge 720. In a non-limiting example, the hinge 714e may be a stainless steel hinge coupled to an end of the first shank portion 716e, which is also made of a stainless steel material. In another non-limiting example, the hinge 714e may be a spring steel hinge coupled to an end of the first shank portion, where the first shank portion is made of a carbon steel material covered by a biocompatible and/or hydrophilic coating as described above.

In a further non-limiting example, the hinge 714e may be a plastic hinge, such as a flat hinge or a butterfly hinge, manufactured by 3D printing at the same time as the shank portions. In FIG. 7E, the shank portions, such as 716e, are wide, so as to accommodate attachment to the hinge. The width of the shank portions is less than the width of the finger rest and is the same as the width of the hinge.

The finger rest clip having a hinge 740 may be installed on the flange with the finger rest 714f folded against the first shank portion 716f as shown in FIG. 7F. The hinge may be configured to be in an unlocked position when the finger rest is positioned parallel to the shank portion of the finger rest clip.

The hinge 740 may be configured to be in a locked position when a finger rest clip is positioned over the flange of the dental impression tray so that the finger rest is positioned at an angle of −30 degrees to +30 degrees with respect to a line perpendicular to the first shank portion 716g as shown in FIG. 7G.

After inserting the finger rest clip on the dental impression tray, the dentist fills the dental impression tray with impression material and inserts the dental impression tray in the patient's mouth. The dentist then exerts a threshold external force to the finger rest to press it into a locked position.

When the dental impression tray is an upper dental impression tray, the threshold external force is applied in the upward direction, to rotate the finger rest from the unlocked position to the locked position at which the finger rest is perpendicular to the first shank portion.

When the dental impression tray is a lower dental impression tray, the threshold external force is applied in the downward direction, to rotate the finger rest from the unlocked position to the locked position at which the finger rest is perpendicular to the first shank portion.

In an aspect, the finger rest clips may be made of any one of stainless steel, plastic, metal wire covered with one or more of a biocompatible polymer coating and a hypoallergenic coating, such as polyether ether ketone, (PEEK), medical grade polyurethanes, parylenes, acrylic, polymide, polyoxymethylene (POM), polyethylene terephthalate (PET), polyethylene terephthalate glycol (PETG), and polycarbonate.

In an aspect, the shank of the finger rest clip may be made from a first material and the finger rest may be made of a second material. The first material and the second material may be the same or different materials. The first material may be bendable, so as to form the shank to fit over the flange. In a non-limiting example, the first material may be copper or steel wire coated with a biocompatible polymer coating, polyether ether ketone, (PEEK), medical grade polyurethanes, and parylenes. The second material may be rigid. In a non-limiting example, the second material may be stainless steel or a hard plastic, such as PEEK, acrylic, polymide, polyoxymethylene (POM), polyethylene terephthalate (PET), polyethylene terephthalate glycol (PETG), and polycarbonate.

In an aspect, FIG. 7H depicts a shank portion formed by a round wire 722 surrounded by a biocompatible coating 723. In this aspect, the first shank portion, the top shank portion and the second side portion are one continuous piece and are also coated with the biocompatible coating. The hinge and the finger rest may also be coated with the biocompatible coating if they are formed of metal, such as stainless steel.

Figure 7I:
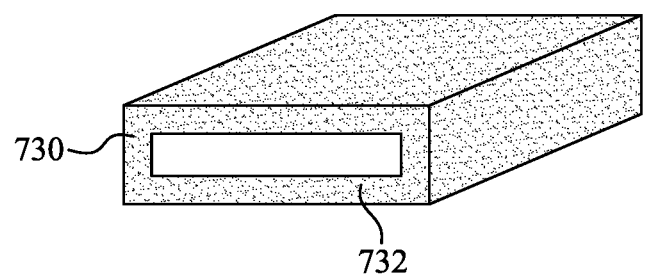
FIG. 7I illustrates a cross-section of a rectangular shank having a rectangular wire surrounded by a biocompatible coating, according to certain embodiments.

In an aspect, FIG. 7I depicts a cross-section of the end of a shank portion formed by a flat wire 730, such as the wide shank portion 716e shown in FIG. 7E, surrounded by a biocompatible coating 732. In this aspect, the first shank portion, the top shank portion and the second side portion are one continuous piece and are coated with the biocompatible coating. The hinge and the finger rest may also be coated with the biocompatible coating if they are formed of metal, such as stainless steel.

Figure 7J:
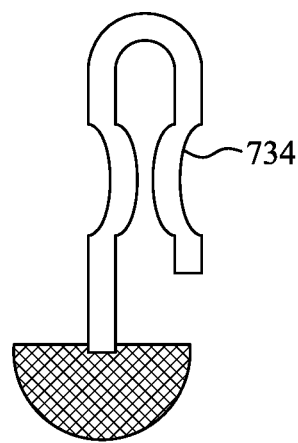
FIG. 7J illustrates an attachment part having a gripping region, according to certain embodiments.

In an aspect, the attachment portion may include a grasping region 734 formed by bends in the first shank portion and the second shank portion, as shown in FIG. 7J.

In an aspect, the first material and the second material, and/or a coating may be hydrophilic, in order to minimize adhesion to the impression material or to tissues of the patient's mouth.

Figure 7K:
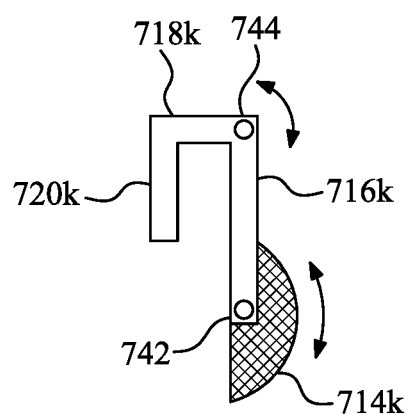
FIG. 7K shows an embodiment of the disclosure in which one or more components of the finger rest are hingeably activated.

FIG. 7K shows a further embodiment of the invention in which the finger rest 714k and the first shank portion 716k are both hingeably attached to the finger rest clip structure.

The finger rest portion 714k may be directly connected to the first shank portion 716k through hinge 742, The hinge 742 permits the finger rest portion 714k to lock in a downward position that is substantially perpendicular to the long axis of the first shank portion 716k. Locking in this position provides a practitioner with greater ease when positioning the finger rest clip with a tray device during use. The finger rest 714k may be raised such that it lies substantially flat with the first shank portion 716k. In this flat or retracted position the finger rest is less likely to cause interference or discomfort for a patient as a dental tray is inserted or placed in position in the oral cavity of the patient 7

The hinges 742 and 744 preferably have a knuckle and pin structure. The knuckle may molded or formed in/on the finger rest portion 714k or the first shank portion 916k. The pin connects the finger rest portion and the first shank portion through a cylindrical axis. The pin may have a recess or extrusion passing along the long axis of the pin that matches a corresponding groove or extrusion on one or more of the knuckle structures present on the finger rest portion 714k or the first shank portion 716k. When the groove and/or extrusion portions meet, a locking configuration is achieved such that the finger rest portion is locked in a perpendicular orientation with respect to the long axis of the first shank portion 716k. The pin/knuckle and corresponding extrusion/groove structure prohibits rotation of the finger rest portion 714k beyond an angle of 90° from the plane defined by the first shank portion 716k. A similar structure is utilized for hinge 944 such that the first shank portion 716k may be pivoted upwards to form an extension of the top shank portion 718k. In this manner the finger rest clip may be more easily removed from a dental tray and more easily placed and affixed onto the dental training when it is positioned in the oral cavity of a patient.

Figure 8:
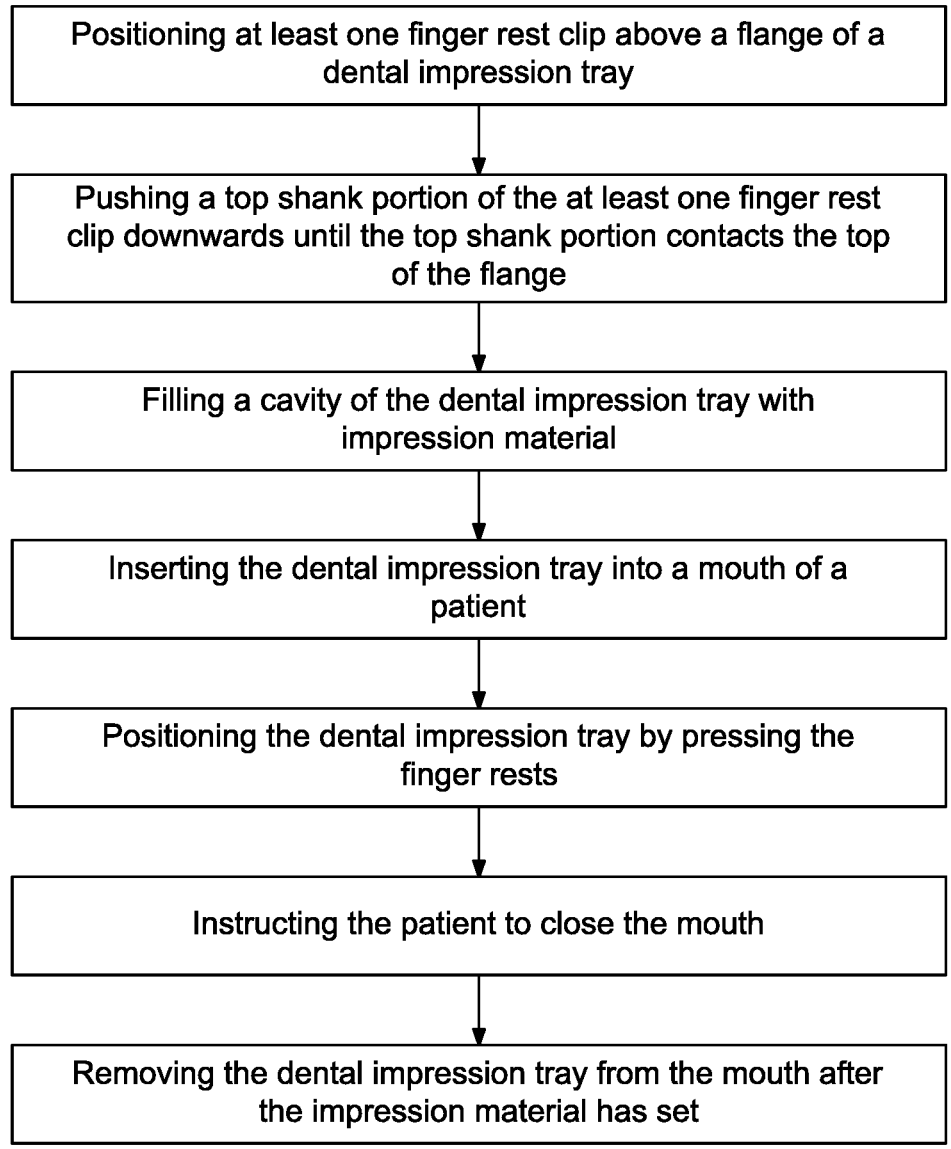
FIG. 8 is a flowchart for a method of using finger rest clips in taking a dental impression, according to certain embodiments.

FIG. 8 is a flowchart of a method for using a finger rest clip with a dental impression tray to take an impression of teeth. In step 1, the dentist positions at least one finger rest clip above a flange of a dental impression tray. In step 2, the dentist pushes a top shank portion of the at least one finger rest clip downwards until the top shank portion contacts a top of the flange, a first shank portion contacts an outer side of the flange and a second shank portion contacts an inner side of the flange. In step 3, the dentist fills the cavity of the dental impression tray with impression material. In step 4, the dentist inserts the dental impression tray into a mouth of a patient. In steps 5, the dentist positions the dental impression tray in the mouth by pressing on a finger rest of the at least one finger rest clip. In step 6, the dentist instructs the patient to close the mouth. In step 7, the dentist waits until the impression material has set, instructs the patient to open the mouth and removes the dental impression tray from the mouth.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for taking an impression of a tooth structure of a patient's mouth, comprising:
    a dental impression tray configured with a flange surrounding a central cavity, wherein the dental impression tray is one of an upper dental impression tray configured for taking an impression of a maxillary teeth structure and a lower dental impression tray configured for taking an impression of a mandibular teeth structure;

a plurality of finger rest clips, each finger rest clip including:
an attachment part with, a first shank portion, a second shank portion, and a top shank portion between the first and second shank portions, configured to couple to the flange by being pushed downwards over a top of the flange until the top shank portion contacts the top of the flange, the first shank portion contacts an outer side of the flange and the second shank portion contacts an inner side of the flange, and a finger rest configured to extend outwardly at an angle to the flange; and
a dental impression material configured to fill the central cavity.

2. The system of claim 1, further comprising: wherein a first end of the attachment part is configured to hook over the flange; and the finger rest further configured to extend at the angle with respect to a perpendicular of a second end of the attachment part.

3. The system of claim 2, wherein the attachment part comprises one of a flat wire surrounded by a biocompatible coating and a round wire surrounded by a biocompatible coating.

4. The system of claim 2, wherein the attachment part and the finger rest are coated with a hydrophilic material, wherein the hydrophilic material is configured to prevent adhesion of the finger rest clip to the impression material and tissues of a patient's mouth.

5. The system of claim 2, wherein: a material of the attachment part is one of stainless steel, plastic, copper wire covered with one or more of a biocompatible polymer coating and a hypoallergenic coating, steel wire covered with one or more of a biocompatible polymer coating and a hypoallergenic coating, wherein the biocompatible coating and the hypoallergenic coating may be selected from the group comprising polyether ether ketone, (PEEK), medical grade polyurethanes, parylenes, acrylic, polymide, polyoxymethylene (POM), polyethylene terephthalate (PET), polyethylene terephthalate glycol (PETG), and polycarbonate; and a material of the finger rest is one of stainless steel and a hard plastic selected from the group comprising PEEK, acrylic, polymide, polyoxymethylene (POM), polyethylene terephthalate (PET), polyethylene terephthalate glycol (PETG), and polycarbonate.

6. The system of claim 2, wherein the angle is in the range of −30 degrees to +30 degrees.

7. The system of claim 2, further comprising one or more of: a first hinge connected between the finger rest and the second end of the attachment part; and a second hinge connected between the first shank portion and the top shank portion.

8. The system of claim 7, wherein the hinge is one of a metal hinge coated with polymer, a metal hinge covered with a biocompatible coating, stainless steel hinge; a plastic butterfly hinge; a knuckle and pin hinge and a plastic flat hinge.

9. The system of claim 2, where the attachment part further comprises: the first shank portion being of a height H1, the first shank portion including the first end and the second end; the second shank portion being of a height H2, the second shank portion having a third end and a fourth end; and the top shank portion connected to the second end and the fourth end.

10. The system of claim 9, further comprising: an adjustable hinge connected between the finger rest and the second end of the attachment part, wherein the adjustable hinge is configured to hold the finger rest at a selected angle with respect to the perpendicular of the second end of the attachment part.

11. The system of claim 10, wherein the adjustable hinge is configured to rotate from an unlocked position to a locked position upon application of a threshold force.

12. The system of claim 11, wherein the locked position is perpendicular to the first shank portion.

13. The system of claim 11, wherein the locked position is in a range of 60 degrees to 90 degrees with respect a longitudinal axis of the first shank portion.

14. The system of claim 11, wherein the locked position is in a range of 90 degrees to 120 degrees with respect a longitudinal axis of the first shank portion.

15. The system of claim 9, wherein the attachment part includes a grasping region configured to compress the sides of the flange and hold the attachment part securely to the flange, wherein the grasping region is formed by a bend in the first shank portion and a corresponding bend in the second shank portion, wherein the first bend is towards the second bend and the second bend is towards the first bend.

16. The system of claim 9, further comprising: a patterned region on an outer side of the top shank portion, the patterned region configured to indicate a pressing point for installing the finger rest clip on the flange.

17. The system of claim 9, wherein a cross-section of the shank portions are one of rectangular and cylindrical.

18. The system of claim 9, wherein the first shank portion, the top shank portion and the second shank portion are integral and conformal with a shape of the flange.

19. A method for using a finger rest clip with a dental impression tray to take an impression of teeth, comprising:
positioning at least one finger rest clip above a flange of a dental impression tray;
pushing a top shank portion of the at least one finger rest clip downwards until the top shank portion contacts a top of the flange, a first shank portion contacts an outer side of the flange and a second shank portion contacts an inner side of the flange;
filling a cavity of the dental impression tray with impression material;
inserting the dental impression tray into a mouth of a patient;
instructing the patient to close the mouth while positioning the dental impression tray in the mouth by pressing on a finger rest of the at least one finger rest clip; and
removing the dental impression tray after the impression material has set.

20. The method of claim 19, further comprising: pressing the finger rest with a threshold pressure until the finger rest is in a locked position with respect to an angle with a perpendicular to a longitudinal axis of the first shank portion, wherein the angle is in the range of −30 degrees to +30 degrees with respect to the perpendicular.

* * * * *

UNITED STATES PATENT AND TRADEMARK OFFICE
CERTIFICATE OF CORRECTION

PATENT NO. : 11,311,356 B1
APPLICATION NO. : 17/517271
DATED : April 26, 2022
INVENTOR(S) : Hammam Ahmed Salim Bahammam It is certified that error appears in the above-identified patent and that said Letters Patent is hereby corrected as shown below:

In the Specification

Column 1, after the title of the invention, please insert:
--STATEMENT OF ACKNOWLEDGEMENT
The inventors extend their appreciation to the Deputyship for Research & Innovation, Ministry of Education in Saudi Arabia for funding this research work through project number 2021-093 and King Abdulaziz University, DSR, Jeddah, Saudi Arabia.--

Signed and Sealed this
Ninth Day of August, 2022

Katherine Kelly Vidal
*Director of the United States Patent and Trademark Office*